US010123353B2

(12) United States Patent
Yang et al.

(10) Patent No.: US 10,123,353 B2
(45) Date of Patent: Nov. 6, 2018

(54) METHOD AND APPARATUS FOR PERFORMING RANDOM ACCESS PROCESS IN WIRELESS COMMUNICATION SYSTEM

(71) Applicant: LG ELECTRONICS INC., Seoul (KR)

(72) Inventors: Suckchel Yang, Anyang-si (KR); Joonkui Ahn, Anyang-si (KR); Dongyoun Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 115 days.

(21) Appl. No.: 14/367,436

(22) PCT Filed: Dec. 20, 2012

(86) PCT No.: PCT/KR2012/011165
§ 371 (c)(1),
(2) Date: Jun. 20, 2014

(87) PCT Pub. No.: WO2013/095004
PCT Pub. Date: Jun. 27, 2013

(65) Prior Publication Data
US 2014/0355539 A1    Dec. 4, 2014

Related U.S. Application Data

(60) Provisional application No. 61/577,680, filed on Dec. 20, 2011.

(51) Int. Cl.
*H04W 74/08* (2009.01)
*H04L 5/00* (2006.01)
(Continued)

(52) U.S. Cl.
CPC ....... *H04W 74/0833* (2013.01); *H04L 1/1887* (2013.01); *H04L 1/1893* (2013.01);
(Continued)

(58) Field of Classification Search
None
See application file for complete search history.

(56) References Cited

U.S. PATENT DOCUMENTS

| 8,582,510 B2* | 11/2013 | Pasad | H04W 74/006 |
| | | | 370/329 |
| 2010/0189032 A1* | 7/2010 | Chen | H04B 1/7143 |
| | | | 370/328 |

(Continued)

FOREIGN PATENT DOCUMENTS

| CN | 101841400 | 9/2010 |
| CN | 102123516 | 7/2011 |

(Continued)

OTHER PUBLICATIONS

Huawei, "Location of Msg2 for RACH on SCell", Aug. 26, 2011, 3GPP TSG-RAN WG2 Meeting #75, pp. 1-4.*

(Continued)

*Primary Examiner* — Steve R Young
(74) *Attorney, Agent, or Firm* — Lee Hong Degerman Kang Waimey

(57) ABSTRACT

The present invention relates to a wireless communication system. In detail, the present invention is a method in which user equipment for which a plurality of cells is constituted receives control information in a carrier aggregation-based wireless communication system, and an apparatus for the method. The method comprises: a step of receiving, through a first cell, uplink resource allocation information for a second cell; a step of transmitting an uplink signal on the second cell using the uplink resource allocation information; and a step of receiving response information to the uplink signal. The response information is received via a specific cell rather than the first cell when the uplink signal is transmitted by a random access process, and the response (Continued)

information is received via the first cell when the uplink signal is transmitted by a non-random access process.

10 Claims, 11 Drawing Sheets

(51) Int. Cl.
      *H04W 74/00*       (2009.01)
      *H04L 1/18*       (2006.01)

(52) U.S. Cl.
      CPC ........... *H04L 5/001* (2013.01); *H04W 74/008* (2013.01); *H04L 5/0053* (2013.01); *H04L 5/0055* (2013.01)

(56) References Cited

U.S. PATENT DOCUMENTS

| | | | | |
|---|---|---|---|---|
| 2011/0299486 | A1* | 12/2011 | Wu | H04W 72/1268 370/329 |
| 2012/0250520 | A1* | 10/2012 | Chen | H04L 5/001 370/241 |
| 2013/0010716 | A1* | 1/2013 | Dinan | H04W 76/025 370/329 |
| 2013/0064165 | A1* | 3/2013 | Chen | H04W 56/0045 370/312 |
| 2015/0271854 | A1* | 9/2015 | Pelletier | H04W 56/0005 370/329 |

FOREIGN PATENT DOCUMENTS

| | | |
|---|---|---|
| CN | 102255718 | 11/2011 |
| EP | 2393334 | 12/2011 |
| KR | 10-2011-0007064 | 1/2011 |
| KR | 10-2011-0113484 | 10/2011 |
| KR | 10-2011-0133444 | 12/2011 |
| RU | 2426251 | 8/2011 |
| WO | 2010/124228 | 10/2010 |
| WO | 2011/116365 | 9/2011 |
| WO | 2011/126343 | 10/2011 |

OTHER PUBLICATIONS

LG Electronics, "RAN1 issues in supporting multiple timing advances," 3GPP TSG RAN WG1 #67, R1-113975, Nov. 2011, 5 pages.
Panasonic, "Channels and signals for additional carrier type," 3GPP TSG-RAN WG1 Meeting #67, R1-113804, Nov. 2011, 3 pages.
Samsung, "Views on open questions for CA with different TDD UL-DL configurations," 3GPP TSG RAN WG1 #66b, R1-113079, Oct. 2011, 3 pages.
LG Electronics, "Solutions for Inter-band CA with Different TDD UL/DL Configurations," 3GPP TSG RAN WG1 Meeting #67, R1-113908, Nov. 2011, 4 pages.
3rd Generation Partnership Project (3GPP), "Technical Specification Group Radio Access Network; Evolved Universal Terrestrial Radio Access (E-UTRA); Medium Access Control (MAC) protocol specification (Release 10)," 3GPP TS 36.321 V10.2.0, Jun. 2011, 54 pages.
PCT International Application No. PCT/KR2012/011165, Written Opinion of the International Searching Authority dated Apr. 16, 2013, 15 pages.
Samsung, "DL/UL HARQ-ACK transmission in CA with different TDD UL-DL configurations," 3GPP TSG RAN WG1 #66, R1-113081, Oct. 2011, 5 pages.
ITRI, "Considerations on the remaining issues of Random Access on SCell," 3GPP TSG RAN WG2 #75, R2-114213, Aug. 2011, 4 pages.
Huawei, et al., "Location of Msg2 for RACH on Scell," 3GPP TSG-RAN WG2 Meeting #75, R2-113995, Aug. 2011, 4 pages.
LG Electronics Inc., "Remaining RACH linking," 3GPP TSG-RAN2 Meeting #70, R2-103129, May 2010, 3 pages.
LG Electronics Inc., "PHICH reception for the PUSCH transmission scheduled by RAR grant with multiple TAGs," 3GPP TSG RAN WG1 #72, R1-130242, Jan. 2013, 4 pages.
European Patent Office Application Serial No. 12860225.7, Search Report dated Jul. 21, 2015, 7 pages.
Russian Federation Federal Service for Intellectual Property, Patents and Trademarks Application Serial No. 2014129839/07, Notice of Allowance dated Oct. 2, 2015, 9 pages.
IP Australia Application Serial No. 2012354454, Office Action dated Jan. 8, 2015, 2 pages.
Sharp, "Considerations for Contention based RACH on SCell", R2-113955, 3GPP TSG-RAN WG2#75, Aug. 2011, 6 pages.
New Postcom, "Discussion on TDD inter-band CA with different UL-DL configuration", R1-113685, 3GPP TSG RAN WG1 Meeting #67, Nov. 2011, 6 pages.
Sharp, "Contention based RA procedure in Multi-TA", R2-115390, 3GPP TSG-RAN WG2#75bis, Oct. 2011, 4 pages.
Renesas Mobile Europe, "Multiple timing advance using multiple RACH", R2-113014, 3GPP TSG-RAN WG2 Meeting #174, May 2011, 3 pages.

\* cited by examiner

METHOD AND APPARATUS FOR PERFORMING RANDOM ACCESS PROCESS IN WIRELESS COMMUNICATION SYSTEM

CROSS-REFERENCE TO RELATED APPLICATIONS

This application is the National Stage filing under 35 U.S.C. 371 of International Application No. PCT/KR2012/011165, filed on Dec. 20, 2012, which claims the benefit of U.S. Provisional Application Ser. No. 61/577,680, filed on Dec. 20, 2011, the contents of which are hereby incorporated by reference herein in their entirety.

TECHNICAL FIELD

The present invention relates to a wireless communication system and, more particularly, to a method for performing a random access procedure in a carrier aggregation (CA)-based wireless communication system and an apparatus for the same.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as code division multiple access (CDMA), frequency division multiple access (FDMA), time division multiple access (TDMA), orthogonal frequency division multiple access (OFDMA), or single carrier frequency division multiple access (SC-FDMA).

DISCLOSURE

Technical Problem

An object of the present invention devised to solve the problem lies in a method for efficiently performing a random access procedure in a CA-based wireless communication system and an apparatus for the same. Another object of the present invention is to provide a method for efficiently transmitting/receiving control information (e.g. acknowledgement information) involved in the random access procedure.

The technical problems solved by the present invention are not limited to the above technical problems and those skilled in the art may understand other technical problems from the following description.

Technical Solution

The object of the present invention can be achieved by providing a method for receiving control information by a user equipment (UE) for which a plurality of cells is configured in a carrier aggregation-based wireless communication system, the method including: receiving, through a first cell, uplink resource allocation information for a second cell; transmitting an uplink signal on the second cell using the uplink resource allocation information; and receiving acknowledgement information for the uplink signal, wherein the acknowledgement information is received via a specific cell rather than the first cell when the uplink signal is transmitted by a random access procedure, the acknowledgement information being received via the first cell when the uplink signal is transmitted by a non-random access procedure.

In another aspect of the present invention, provided herein is a UE for use in a carrier aggregation-based wireless communication system, including a radio frequency (RF) unit and a processor, wherein the processor is configured to receive, through a first cell, uplink resource allocation information for a second cell, to transmit an uplink signal on the second cell using the uplink resource allocation information and to receive acknowledgement information on the uplink signal, wherein the acknowledgement information is received via a specific cell other than the first cell when the uplink signal is transmitted by a random access procedure, wherein the acknowledgement information is received via the first cell when the uplink signal is transmitted by a non-random access procedure.

The first cell may be a primary cell (PCell) and the second cell may be a secondary cell (SCell).

The specific cell may be an SCell configured to scheduling the second cell.

The specific cell may be an SCell configured to monitor a physical downlink control channel (PDCCH) having a cell radio network temporary identifier (C-RNTI) for the second cell.

The second cell and the specific cell may be different SCells.

The second cell and the specific cell may be the same SCell.

The first cell may belong to a first timing advance (TA) group, the second cell may belong to a second TA group, and the first TA group and the second TA group may be different from each other.

Advantageous Effects

According to the present invention, it is possible to efficiently perform a random access procedure in a CA-based wireless communication system. In addition, it is possible to efficiently transmit/receive control information (e.g. acknowledgement information) involved in the random access procedure.

The effects of the present invention are not limited to the above-described effects and other effects which are not described herein will become apparent to those skilled in the art from the following description

DESCRIPTION OF DRAWINGS

The accompanying drawings, which are included to provide a further understanding of the invention, illustrate embodiments of the invention and together with the description serve to explain the principle of the invention. In the drawings.

BEST MODE

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). $3^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE. While the following description is given, centering on 3GPP LTE/LTE-A for clarity, this is purely exemplary and thus should not be construed as limiting the present invention.

In a wireless communication system, a UE receives information from a BS on downlink (DL) and transmits information to the BS on uplink (UL). Information transmitted/received between the BS and the UE includes data and various types of control information and various physical channels are present according to type/purpose of information transmitted/received between the BS and the UE.

Figure 1:
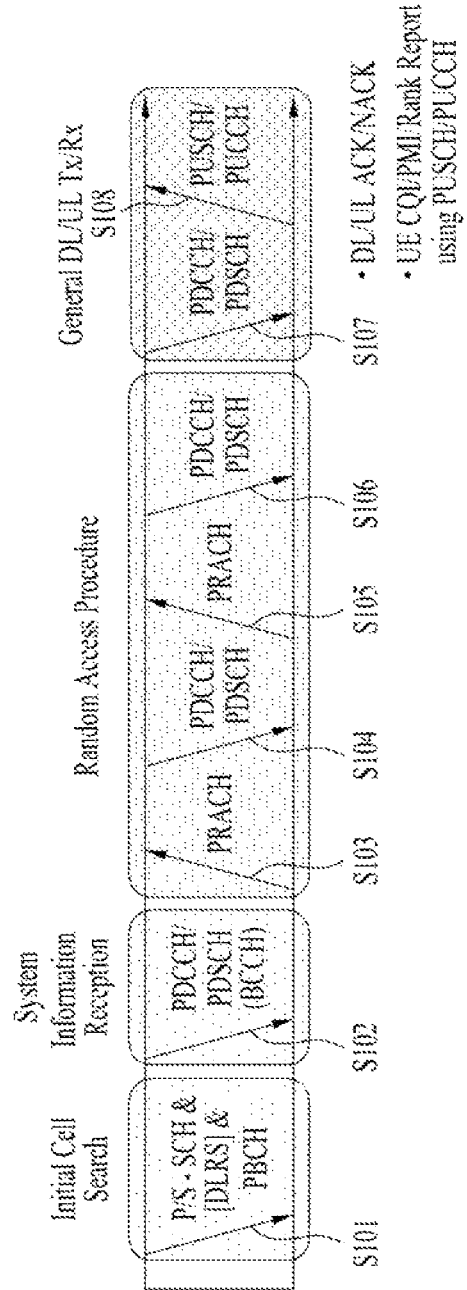
FIG. 1 illustrates physical channels used in 3GPP LTE(-A) and a signal transmission method using the same.

FIG. 1 illustrates physical channels used in 3GPP LTE(-A) and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the mean time, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
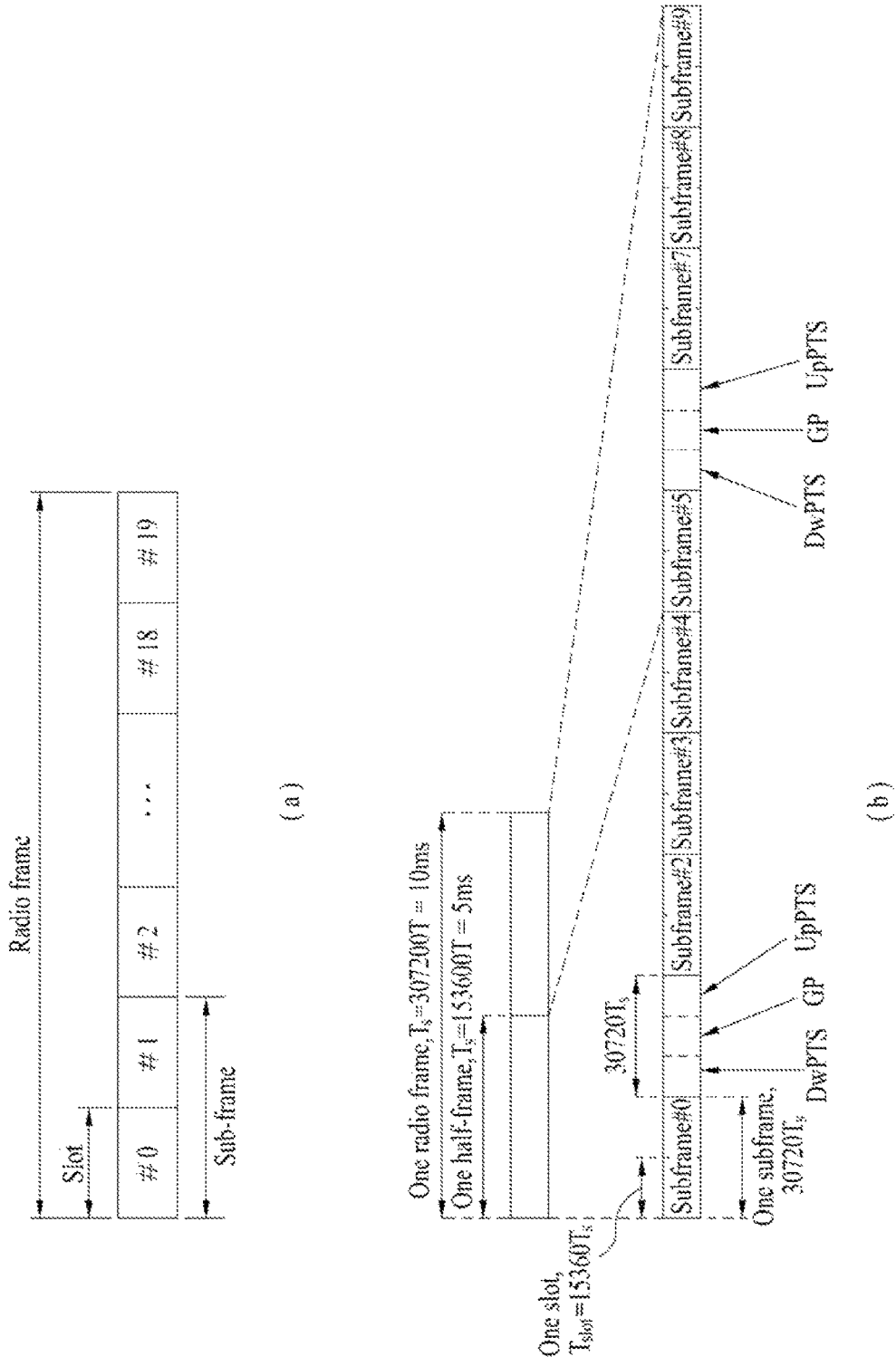
FIG. 2 illustrates a radio frame structure for use in LTE(-A)

FIG. 2 illustrates a radio frame structure. Uplink/downlink data packet transmission is performed on a subframe-by-subframe basis. A subframe is defined as a predetermined time interval including a plurality of symbols. 3GPP LTE supports a type-1 radio frame structure applicable to frequency division duplex (FDD) and a type-2 radio frame structure applicable to time division duplex (TDD).

FIG. 2($a$) illustrates a type-1 radio frame structure. A downlink subframe includes 10 subframes each of which includes 2 slots in the time domain. A time for transmitting a subframe is defined as a transmission time interval (TTI). For example, each subframe has a duration of 1 ms and each slot has a duration of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2($b$) illustrates a type-2 radio frame structure. The type-2 radio frame includes 2 half frames. Each half frame includes 4(5) normal subframes and 10 special subframes. The normal subframes are used for uplink or downlink according to UL-DL configuration. A subframe is composed of 2 slots.

Table 1 shows subframe configurations in a radio frame according to UL-DL configurations.

TABLE 1

| Uplink-downlink Configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is used for initial cell search, synchronization or channel estimation in a UE and UpPTS is used for channel estimation in a BS and uplink transmission synchronization in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

Figure 3:
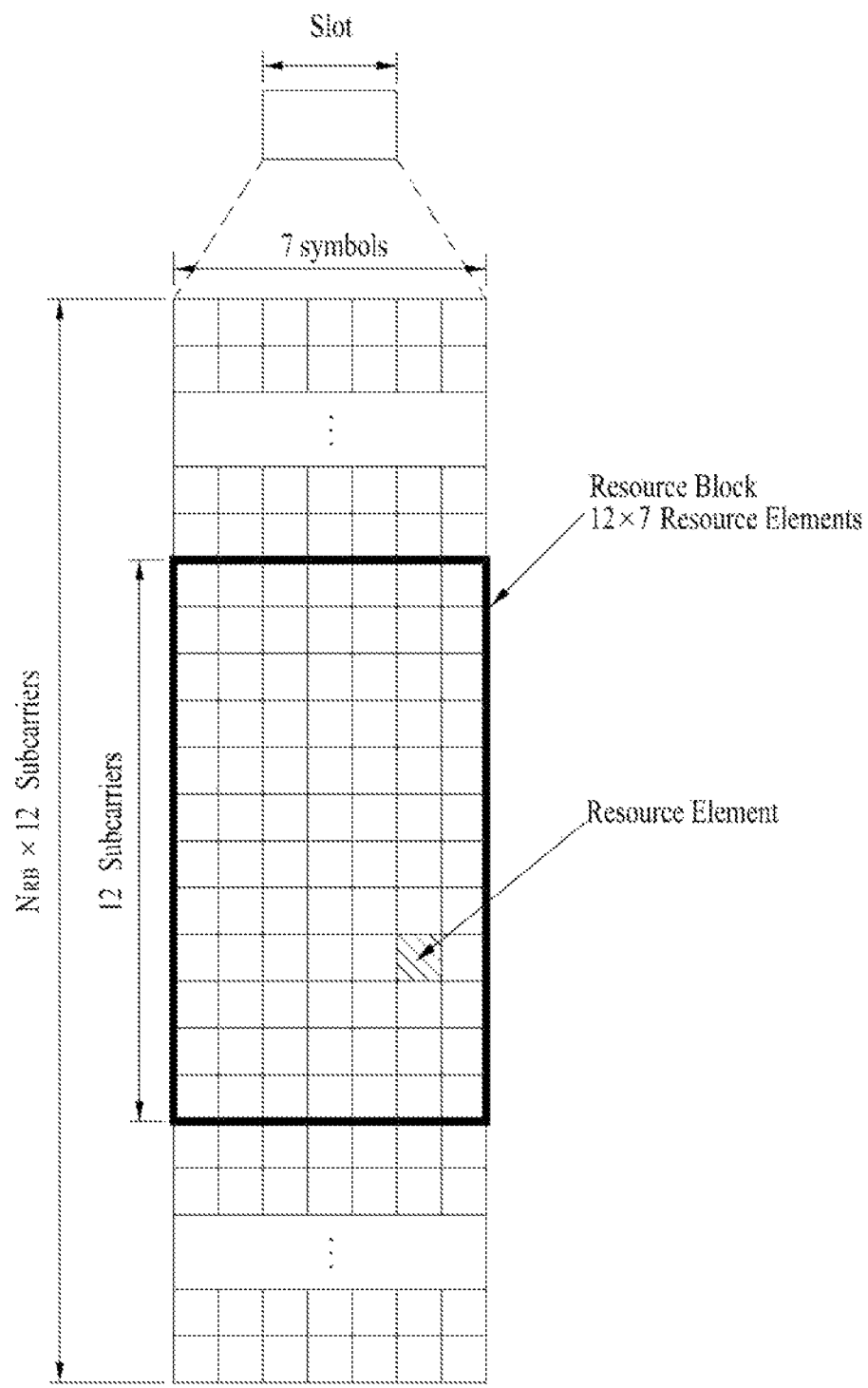
FIG. 3 illustrates a resource grid of a downlink slot.

FIG. 3 illustrates a resource grid of a downlink slot.

Referring to FIG. 3, a downlink slot includes a plurality of OFDM symbols in the time domain. While one downlink slot may include 7 OFDM symbols and one resource block (RB) may include 12 subcarriers in the frequency domain in the figure, the present invention is not limited thereto. Each element on the resource grid is referred to as a resource element (RE). One RB includes 12×7 REs. The number $N_{RB}$ of RBs included in the downlink slot depends on a downlink transmit bandwidth. The structure of an uplink slot may be same as that of the downlink slot.

Figure 4:
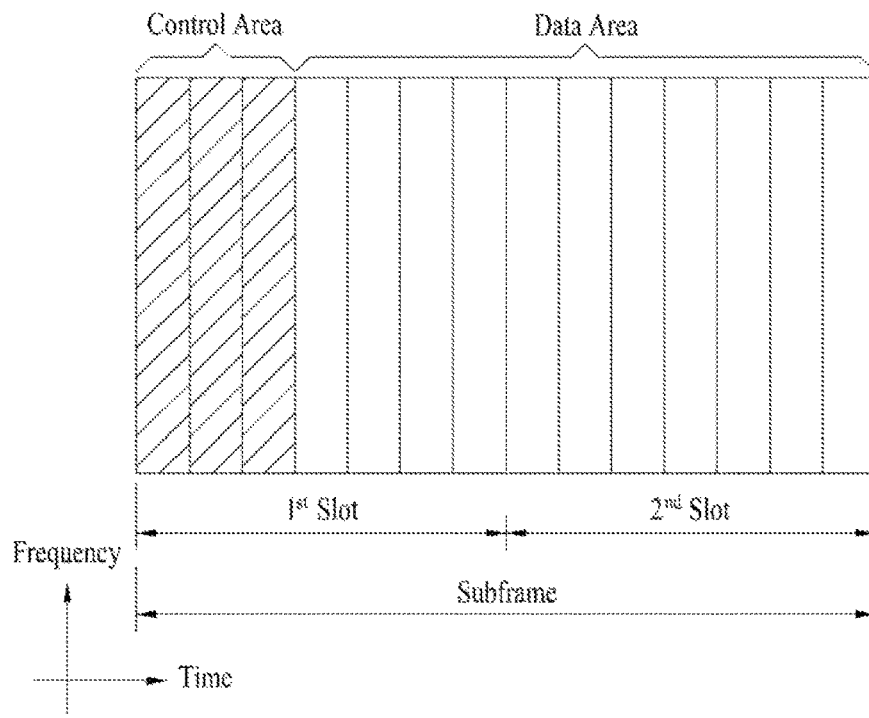
FIG. 4 illustrates a downlink subframe structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is an RB. Examples of downlink control channels used in LTE include a physical control format indicator channel (PCFICH), a physical downlink control channel (PDCCH), a physical hybrid ARQ indicator channel (PH-ICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal. Control information transmitted through the PDCCH is referred to as downlink control information (DCI). The DCI includes uplink or downlink scheduling information or an uplink transmit power control command for an arbitrary UE group.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. Information field type, the number of information fields, the number of bits of each information field, etc. depend on DIC format. For example, the DCI formats selectively include information such as hopping flag, RB assignment, MCS (Modulation Coding Scheme), RV (Redundancy Version), NDI (New Data Indicator), TPC (Transmit Power Control), HARQ process number, PMI (Precoding Matrix Indicator) confirmation as necessary. Accordingly, the size of control information matched to a DCI format depends on the DCI format. A arbitrary DCI format may be used to transmit two or more types of control information. For example, DIC formats 0/1A is used to carry DCI format 0 or DIC format 1, which are discriminated from each other using a flag field.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

The PDCCH carries a message known as DCI which includes resource assignment information and other control information for a UE or UE group. In general, a plurality of PDCCHs can be transmitted in a subframe. Each PDCCH is transmitted using one or more CCEs. Each CCE corresponds to 9 sets of 4 REs. The 4 REs are referred to as an REG. 4 QPSK symbols are mapped to one REG. REs allocated to a reference signal are not included in an REG, and thus the total number of REGs in OFDM symbols depends on presence or absence of a cell-specific reference signal. The concept of REG (i.e. group based mapping, each group including 4 REs) is used for other downlink control channels (PCFICH and PHICH). That is, REG is used as a basic resource unit of a control region. 4 PDCCH formats are supported as shown in Table 2.

TABLE 2

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

LTE defines CCE positions in a limited set in which PDCCHs can be positioned for each UE. CCE positions in a limited set that the UE needs to monitor in order to detect the PDCCH allocated thereto may be referred to as a search space (SS). In LTE, the SS has a size depending on PDCCH format. A UE-specific search space (USS) and a common search space (CSS) are separately defined. The USS is set per UE and the range of the CSS is signaled to all UEs. The USS and the CSS may overlap for a given UE. In the case of a considerably small SS with respect to a specific UE, when some CCEs positions are allocated in the SS, remaining CCEs are not present. Accordingly, the BS may not find CCE resources on which PDCCHs will be transmitted to available UEs within given subframes. To minimize the possibility that this blocking continues to the next subframe, a UE-specific hopping sequence is applied to the starting point of the USS.

Table 3 shows sizes of the CSS and USS.

TABLE 3

| PDCCH format | Number of CCEs (n) | Number of candidates in CSS | Number of candidates in USS |
|---|---|---|---|
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the USS. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the CSS. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier. PDSCH transmission schemes and information content of DCI formats according to transmission mode (TM) are arranged below.

Transmission Mode (TM)
  Transmission mode 1: Transmission from a single base station antenna port
  Transmission mode 2: Transmit diversity
  Transmission mode 3: Open-loop spatial multiplexing
  Transmission mode 4: Closed-loop spatial multiplexing
  Transmission mode 5: Multi-user MIMO (Multiple Input Multiple Output)
  Transmission mode 6: Closed-loop rank-1 precoding
  Transmission mode 7: Single-antenna port (port 5) transmission
  Transmission mode 8: Double layer transmission (ports 7 and 8) or single-antenna port (port 7 or 8) transmission
  Transmission mode 9: Transmission through up to 8 layers (ports 7 to 14) or single-antenna port (port 7 or 8) transmission DCI Format
  Format 0: Resource grants for PUSCH transmission
  Format 1: Resource assignments for single codeword PDSCH transmission (transmission modes 1, 2 and 7)
  Format 1A: Compact signaling of resource assignments for single codeword PDSCH (all modes)
  Format 1B: Compact resource assignments for PDSCH using rank-1 closed loop precoding (mod 6)
  Format 1C: Very compact resource assignments for PDSCH (e.g. paging/broadcast system information)
  Format 1D: Compact resource assignments for PDSCH using multi-user MIMO (mode 5)
  Format 2: Resource assignments for PDSCH for closed-loop MIMO operation (mode 4)
  Format 2A: Resource assignments for PDSCH for open-loop MIMO operation (mode 3)
  Format 3/3A: Power control commands for PUCCH and PUSCH with 2-bit/1-bit power adjustments FIG. 5 illustrates an uplink subframe structure.

Figure 5:
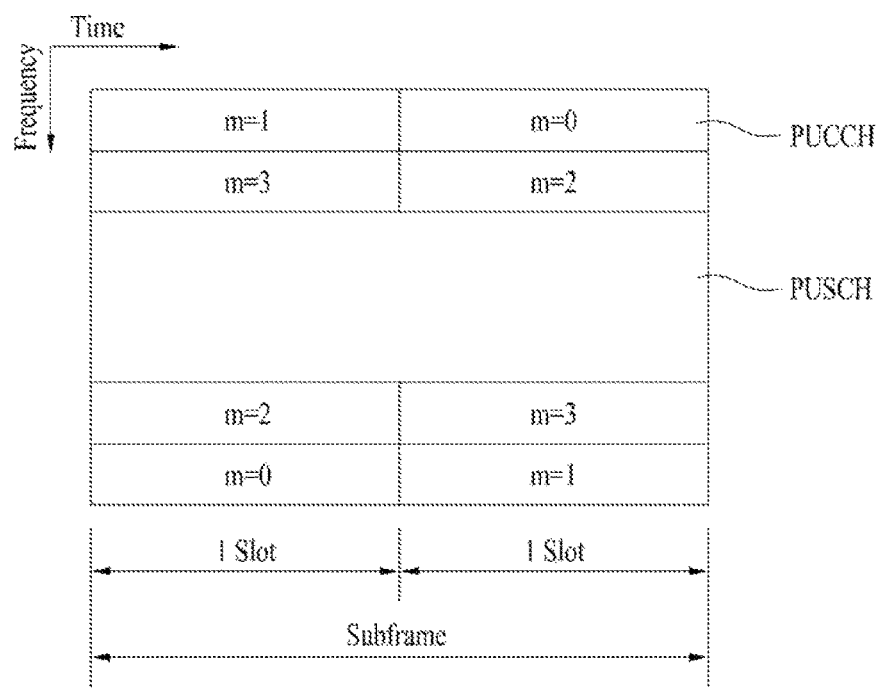
FIG. 5 illustrates an uplink subframe structure.

Referring to FIG. 5, an uplink subframe includes a plurality of (e.g. 2) slots. A slot may include different numbers of SC-FDMA symbols according to CP lengths. For example, a slot may include 7 SC-FDMA symbols in a normal CP case. The uplink subframe is divided into a control region and a data region in the frequency domain. The data region is allocated with a PUSCH and used to carry a data signal such as audio data. The control region is allocated a PUCCH and used to carry control information. The PUCCH includes an RB pair (e.g. m=0, 1, 2, 3) located at both ends of the data region in the frequency domain and hopped in a slot boundary. Control information includes HARQ ACK/NACK, CQI, PMI, RI, etc.

A description will be given of a random access procedure. The random access procedure is referred to as a random access channel (RACH) procedure. The random access procedure is used for initial access, uplink synchronization control, resource assignment, handover, etc. The random access procedure is classified into contention-based procedure and a dedicated (i.e. non-contention-based) procedure. The contention-based random access procedure includes initial access and is normally used and the dedicated random access procedure is limited to handover, etc. In the contention-based random access procedure, a UE randomly selects an RACH preamble sequence. Accordingly, a plurality of UE can simultaneously transmit the same RACH preamble sequence, which requires a contention resolution procedure. In the dedicated random access procedure, the UE uses an RACH preamble sequence uniquely allocated thereto by the BS. Accordingly, the UE can perform the random access procedure without collision with other UEs.

Figure 6A:
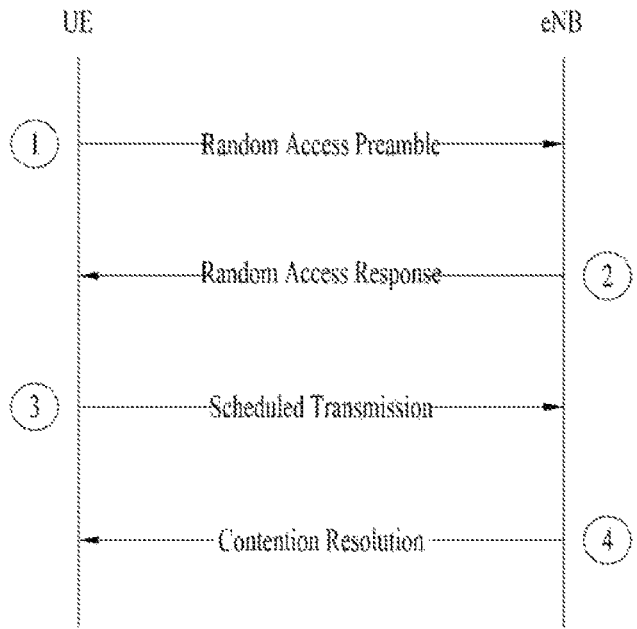
FIGS. 6a and 6b illustrate random access procedures.
Figure 6B:
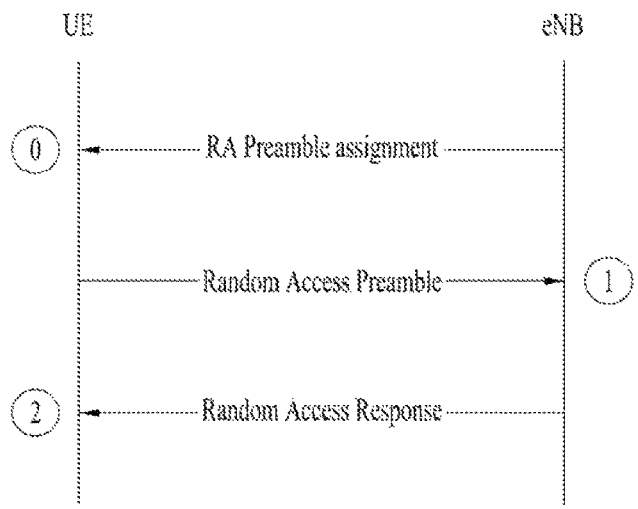

FIGS. 6a and 6b illustrate random access procedures. FIG. 6a shows a contention-based random access procedure and FIG. 6b shows a dedicated random access procedure.

Referring to FIG. 6a, the contention-based random access procedure includes the following four steps. Messages transmitted in steps 1 to 4 may be respectively referred to as messages (Msg) 1 to 4.

Step 1: RACH preamble (via PRACH) (UE=>eNB)
Step 2: Random access response (RAR) (via PDCCH and PDSCH) (eNB=>UE)
Step 3: Layer2/Layer3 message (via PUSCH) (UE=>eNB)
Step 4: Contention resolution message (eNB=>UE)

Referring to FIG. 6b, the dedicated random access procedure includes the following three steps. Messages transmitted in steps 0, 1 and 2 may be respectively referred to as messages (Msg) 0, 1 and 2. Uplink transmission (i.e. step 3) corresponding to RAR may be performed as part of the random access procedure, which is not shown in the figure. The dedicated random access procedure may be triggered using a PDCCH (referred to as PDCCH order hereinafter) used for the BS to order RACH preamble transmission.

Step 0: RACH preamble allocation through dedicated signaling (eNB=>UE)
Step 1: RACH preamble (via PRACH) (UE=>eNB)
Step 2: Random access response (RAR) (via PDCCH and PDSCH) (eNB=>UE)

After transmission of the RACH preamble, the UE attempts to receive a RAR within a predetermined time window. Specifically, the UE attempts to detect a PDCCH (referred to as an RA-RNTI PDCCH hereinafter) having a RA-RNTI (e.g. CRC in the PDCCH is masked with RA-RNTI) within the time window. The UE checks whether a PDSCH corresponding to the RA-RNTI PDCCH includes a RAR therefor when RA-RNTI PDCCH is detected. The RAR includes timing advance (TA) information representing timing offset information for UL synchronization, UL resource allocation information (UL grant information), a temporary UE identifier (e.g. temporary Cell-RNTI (TC-RNTI)), etc. The UE may perform UL transmission (e.g. message 3) according to resource allocation information and a TA value included in the RAR. HARQ is applied to UL transmission corresponding to the RAR. Accordingly, the UE may receive acknowledgement information (e.g. PHICH) corresponding to message 3 after transmission of message 3.

Figure 7:
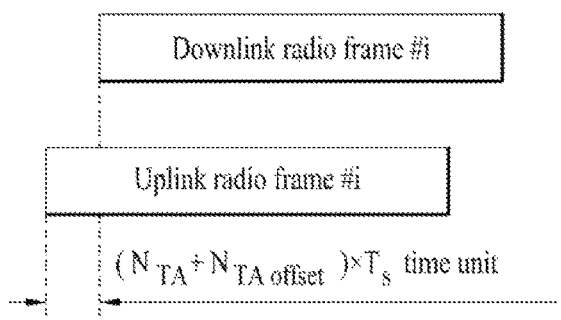
FIG. 7 illustrates uplink-downlink frame timing.

FIG. 7 illustrates uplink-downlink frame timing.

Referring to FIG. 7, transmission of uplink radio frame #i begins $(N_{TA}+N_{TAoffset})*T_s$ seconds before transmission of a downlink radio frame corresponding to the uplink radio frame. In LTE, $0 \leq N_{TA} \leq 20512$, $N_{TAoffset}=0$ in FDD and $N_{TAoffset}=624$ in TDD. $N_{TAoffset}$ is previously known to the BS and UE$_r$. When $N_{TA}$ is indicated through a timing advance command (TA) in a random access procedure, the UE adjusts UL signal (e.g. PUCCH/PUSCH/SRS) transmission timing through the aforementioned formula. The UL signal transmission timing is set to a multiple of $16T_s$. $T_s$ represents sampling time and may be $1/30720$ (ms), for example (refer to FIG. 2). The TA indicates UL timing variation on the basis of the current UL timing. The TA included in the RAR is 11-bit information, which represents 0, 1, 2, . . . , 1282, and timing adjustment value ($N_{TA}$) is represented as $N_{TA}=TA*16$. In other cases, the TA is 6-bit information, which represents 0, 1, 2, . . . , 63, and $N_{TA}$ is represented as $N_{TA,new}=N_{TA,old}+(TA-31)*16$. A TA received in subframe n is applied to subframe n+6 and subsequent subframes. In case of FDD, transmission timing of UL subframe n is advanced from the starting point of DL subframe n, as shown in the figure. In case of TDD, transmission timing of UL subframe n is advanced from the end point of DL subframe n+1 (not shown).

Figure 8:
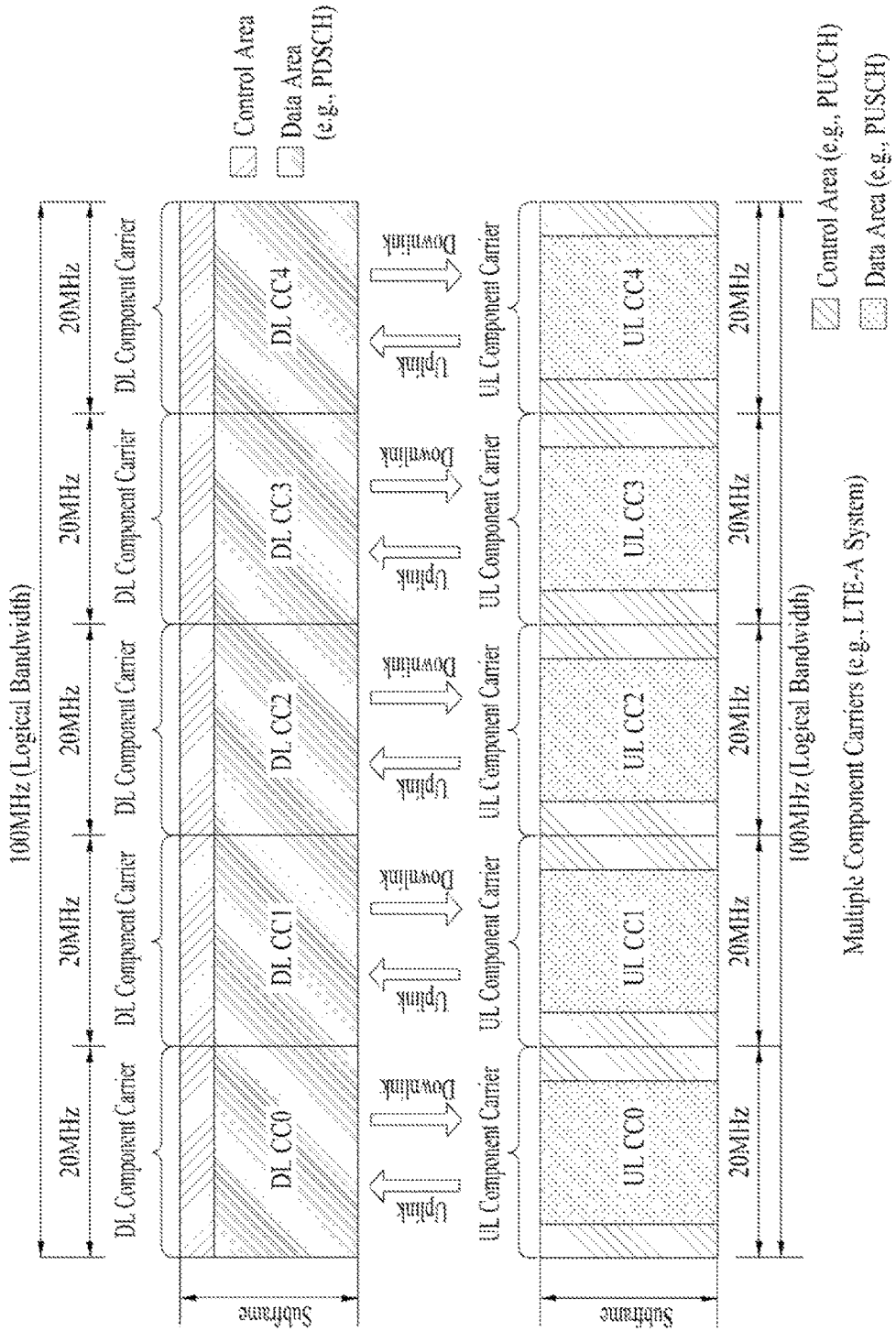
FIG. 8 illustrates a CA (carrier aggregation) communication system.

FIG. 8 illustrates carrier aggregation (CA) communication system.

Referring to FIG. 8, a plurality of UL/DL component carriers (CCs) can be aggregated to support a wider UL/DL bandwidth. The CCs may be contiguous or non-contiguous in the frequency domain. Bandwidths of the CCs can be independently determined Asymmetrical CA in which the number of UL CCs is different from the number of DL CCs can be implemented. Control information may be transmitted/received only through a specific CC. This specific CC may be referred to as a primary CC and other CCs may be referred to as secondary CCs. For example, when cross-carrier scheduling (or cross-CC scheduling) is applied, a PDCCH for downlink allocation can be transmitted on DL CC #0 and a PDSCH corresponding thereto can be transmitted on DL CC #2. The term "component carrier" may be replaced by other equivalent terms (e.g. "carrier", "cell", etc.).

For cross-CC scheduling, a carrier indicator field (CIF) is used. Presence or absence of the CIF in a PDCCH can be determined by higher layer signaling (e.g. RRC signaling) semi-statically and UE-specifically (or UE group-specifically). The baseline of PDCCH transmission is summarized as follows.

■ CIF disabled: a PDCCH on a DL CC is used to allocate a PDSCH resource on the same DL CC or a PUSCH resource on a linked UL CC.
● No CIF
■ CIF enabled: a PDCCH on a DL CC can be used to allocate a PDSCH or PUSCH resource on a specific DL/UL CC from among a plurality of aggregated DL/UL CCs using the CIF.
● LTE DCI format extended to have CIF
  CIF corresponds to a fixed x-bit field (e.g. x=3) (when CIF is set)
  CIF position is fixed irrespective of DIC format size (when CIF is set)

When the CIF is present, the BS may allocate a monitoring DL CC (set) to reduce BD complexity of the UE. For PDSCH/PUSCH scheduling, the UE may detect/decode a PDCCH only on the corresponding DL CCs. The BS may transmit the PDCCH only through the monitoring DL CC (set). The monitoring DL CC set may be set UE-specifically, UE-group-specifically or cell-specifically.

Figure 9:
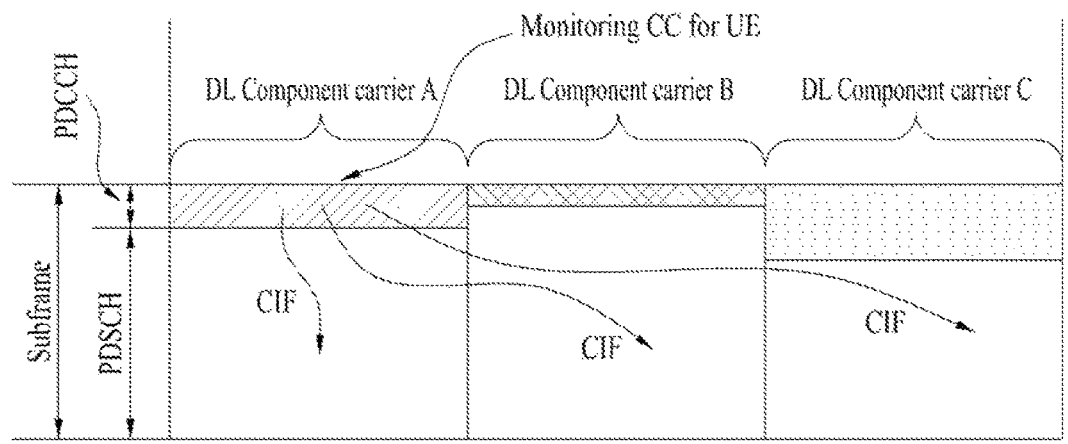
FIG. 9 illustrates cross-carrier scheduling.

FIG. 9 illustrates scheduling when a plurality of carriers is aggregated. It is assumed that 3 DL CCs are aggregated and DL CC A is set to a PDCCH CC. DL CC A~C may be referred to as a serving CC, serving carrier, serving cell, etc. When the CIF is disabled, each DL CC can transmit only a PDCCH that schedules a PDSCH corresponding to the DL CC without a CIF according to LTE PDCCH rule (non-cross-CC scheduling). When the CIF is enabled through UE-specific (or UE-group-specific or cell-specific) higher layer signaling, a specific CC (e.g. DL CC A) can transmit not only the PDCCH that schedules the PDSCH of DL CC A but also PDCCHs that schedule PDSCHs of other DL CCs using the CIF (cross-scheduling). A PDCCH is not transmitted on DL CC B and DL CC C.

In the case of cross-CC scheduling, a DL/UL grant PDCCH for scheduling of DL/UL data transmitted/received on a specific CC (i.e. SCC) and ACK/NACK information for UL data transmitted/received on a CC (i.e. SCC) may be transmitted/received only through a specific CC. The specific CC (or cell) is referred to as a scheduling CC (or cell) or a monitoring CC (or cell) (MCC). A CC (or cell) scheduled for a PDSCH/PUSCH by a PDCCH of another CC is referred to as a scheduled CC (or cell). One or more MCCs may be configured for one UE. The MCC includes a PCC. When only one scheduling CC is present, the scheduling CC may be equivalent to the PCC. In the specification, it is assumed that the MCC (e.g. PCC) and SCC are in a cross-CC scheduling relationship, and one or more SCCs may be in a cross-CC scheduling relation with a specific MCC.

When cross-CC scheduling is set, CCs on which signals are transmitted are defined as follows according to signal type.

PDCCH (UL/DL grant): MCC

PDSCH/PUSCH: CC indicated by a CIF of a PDCCH detected from an MCC

DL ACK/NACK (PHICH): MCC

* A CRC of a UL/DL grant PDCCH may be masked with a C-RNTI.

Embodiment: Scheme for Supporting Multiple TAs

When a plurality of CCs is aggregated for a UE, LTE-A considers application of a timing advance (TA) value, which is applicable to a specific CC (e.g. PCC or PCell), to the plurality of CCs. However, multiple CCs belonging to different frequency bands (i.e. largely spaced apart in the frequency domain) or multiple CCs having different propagation characteristics may be aggregated for the UE in the future. In the case of a specific cell, devices such as a remote radio header (RRH) (i.e. repeater) may be deployed in the cell to extend the coverage of the cell or remove a coverage hole. In this case, UL transmission using the method of commonly applying one TA value to a plurality of CCs may have a serious effect on UL signal transmission on the plurality of CCs.

Figure 10:
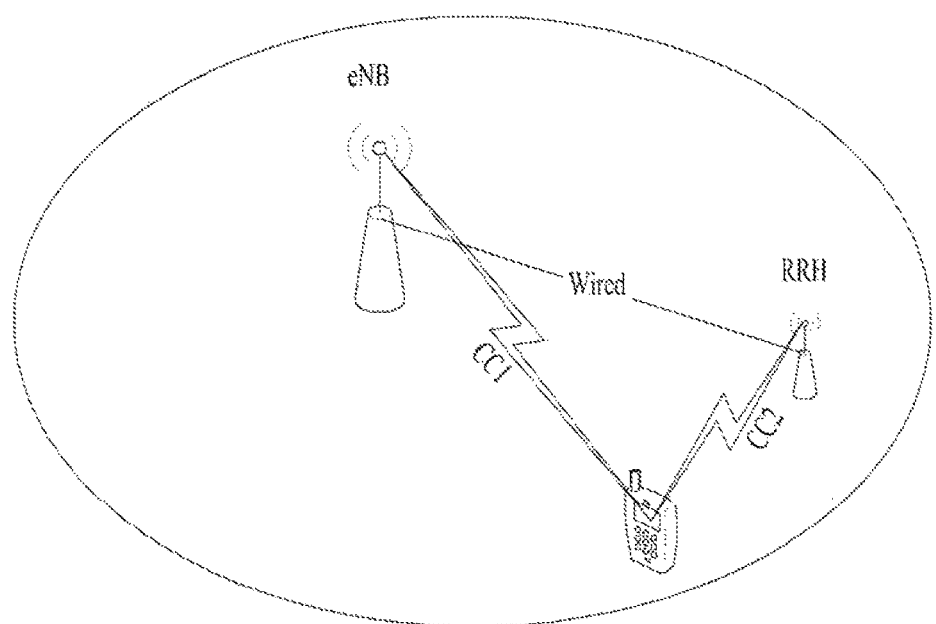
FIG. 10 illustrates aggregation of a plurality of CCs having different UL synchronizations.

FIG. 10 illustrates aggregation of a plurality of CCs having different UL synchronizations. FIG. 10 shows a case in which a UE aggregates two CCs (CC1 and CC2), transmits/receives one of the CCs (CC1) using RRHs due to limited coverage and transmits/receives the other (CC2) through direct communication with an eNB without an RRH. In this case, propagation delay (or reception timing at the eNB) of a UL signal transmitted from the UE through CC1 and propagation delay (or reception timing at the eNB) of a UL signal transmitted from the UE through CC2 may differ from each other due to UE position and frequency characteristics. When a plurality of CCs has different propagation characteristics, the CCs preferably have a plurality of TAs.

Figure 11:
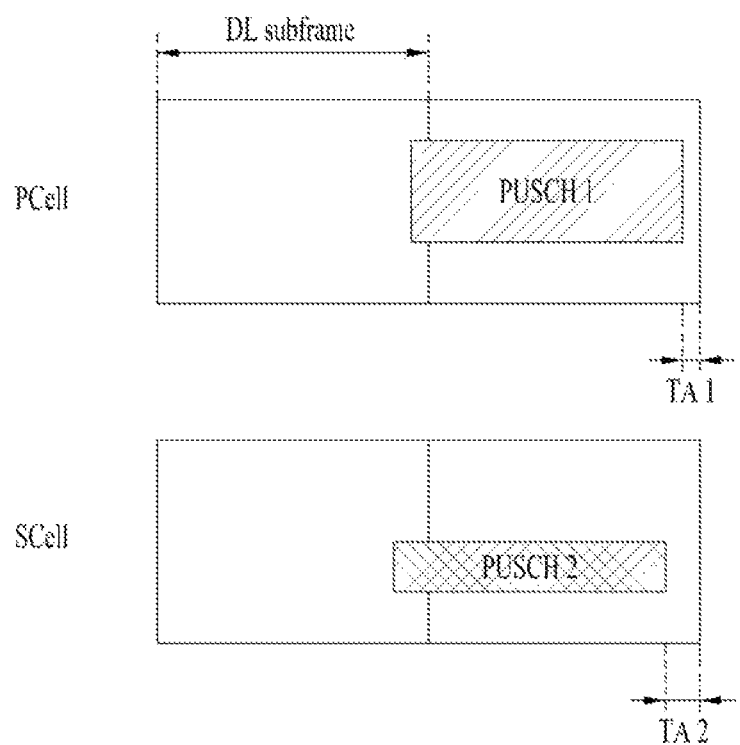
FIG. 11 illustrates UL signal transmission using a plurality of TAs.

FIG. 11 shows a case in which a UE aggregates two CCs (e.g. PCell (PCC) and an SCell (SCC)) and transmits UL signals by applying different TAs to the cells. As shown in FIG. 11, TA1 is applicable to UL transmission of the PCell and TA2 is applicable to UL transmission of the SCell. FIG. 11 illustrates a case in which a UL subframe/signal (e.g. PUSCH, PUCCH, SRS, etc.) transmission end point is advanced by TA from a DL subframe reception end point. Equivalently, a UL subframe/signal (e.g. PUSCH, PUCCH, SRS, etc.) transmission start point may be advanced by TA from a DL subframe reception start point.

Accordingly, it is possible to consider independent allocation of a TA per CC group (hereinafter, referred to as TA group). Here, a TA group (TAG) may include one or more CCs. One TA may be commonly applied to CC(s) in a TAG. In the case of a TAG (referred to as TAG_SCC hereinafter) to which a PCC (PCell) belongs, a TA determined based on the PCC or adjusted through a random access procedure involved with the PCC may be applied to all CC(s) in the TAG PCC. In the case of a TAG (referred to as TAG_SCC) including only SCCs (SCells), a TA determined based on a specific SCC in the TAG_SCC may be applied to all CCs in the TAG_SCC. To achieve this, it may be necessary to perform a random access procedure even through the SCCs, unlike the conventional scheme. The non-contention based random access procedure triggered using a PDCCH (i.e. PDCCH order) by which an eNB orders preamble transmission, rather than the contention based random access procedure triggered by a UE, may be suitable as a random access procedure involved with the SCCs.

Terms with respect to the non-contention based random access procedure using the PDCCH order are arranged as follows.

1) Msg0 (message 0): PDCCH order that orders RACH preamble transmission (eNB=>UE)

2) Msg1 (message 1): RACH preamble corresponding to the PDCCH order (UE=>eNB)

3) Msg2 (message 2): PDSCH (referred to as a RAR PDSCH) including a random access response (eNB=>UE). The random access response includes a UL grant, TA, etc.

* Msg2-PDCCH: DL grant PDCCH corresponding to the RAR PDSCH (eNB=>UE)

4) Msg3 (message 3): PUSCH based on a UL grant in the RAR PDSCH (UE=>eNB)

As described above, only one TA group including the PCC is present in LTE-A. Accordingly, the TA determined based on the PCC for UL synchronization or adjusted through a random access procedure involved with the PCC is commonly applied to all CCs configured for a UE. When the random access procedure involved with the PCC corresponds to the non-contention based scheme using the PDCCH order, a CC on which each message is transmitted and a search space (SS) for PDCCH detection are as follows.

1) Msg0: DL transmission through a common SS (CSS) on the PCC or a USS (UE-specific SS) for PCC scheduling 2) Msg1: UL transmission through the PCC 3-1) Msg2-PDCCH: DL transmission through the CSS on the PCC (a PDCCH having an RA-RNTI can be transmitted only through the CSS in LTE(-A)).

3-2) Msg2: DL transmission through the PCC

4) Msg3: UL transmission through the PCC

In the meantime, a new system may permit a random access procedure (non-contention based random access procedure using the PDCCH order) to be performed through a specific SCC (referred to as an RA-SCC) in TAG_SCC for UL synchronization in the case of TAG (i.e. TAG_SCC) composed of only SCCs. A random access procedure based on RACH preamble transmission on SCCs is referred to as an SCC random access procedure for convenience.

Figure 12:
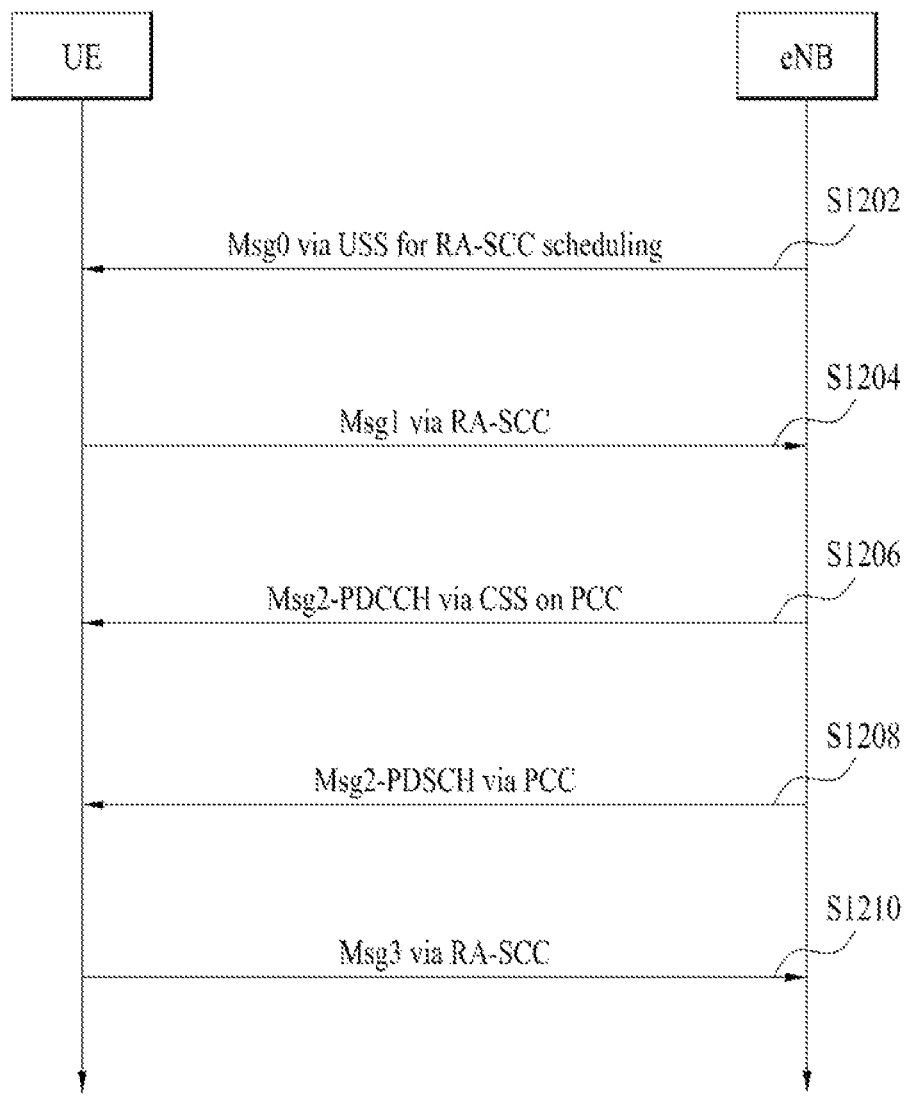
FIG. 12 illustrates a secondary component carrier (SCC) random access procedure.

FIG. 12 illustrates the SCC random access procedure. A TA adjusted/determined based on the SCC random access procedure is commonly applicable to all CC(s) in TAG-SCC.

Referring to FIG. 12, a CC on which each message is transmitted and an SCC for PDCCH detection are determined as follows.

1) Msg0: transmitted from an eNB to a UE through a USS of a RA-SCC scheduling CC (S1202). The USS may be present on a RA-SCC in case of non-cross-CC scheduling and may be present on an MCC (referred to as a RA-MCC) configured to schedule the RS-SCC.

2) Msg1: transmitted from the UE to the eNB through the RA-SCC (S1204).

3-1) Msg2-PDCCH: transmitted from the eNB to the UE through a CSS of the PCC (S1206). A CRC of a DCI format (e.g. DCI format 1A) for Msg2-PDCCH is scrambled with an RA-RNTI. RA-RNTI scrambling is applied to the CSS only.

3-2) Msg2: transmitted from the eNB to the UE through the PCC (S1208).

4) Msg3: transmitted from the UE to the eNB through the RA-SCC (S1210).

Meanwhile, it may be necessary to determine a CC on which a PHICH response to Msg3 is transmitted in the SCC random access procedure. In view of this, a situation in which the eNB fails to receive/decode Msg3 and thus transmits a UL grant PDCCH that indicates retransmission of Msg3 may be considered. In this case, the UL grant PDCCH may be preferably scrambled with a C-RNTI and transmitted through the RA-SCC scheduling USS on a CC configured to schedule the RA-SCC in terms of cross-CC scheduling. Accordingly, it may be efficient for both the eNB and UE to maintain transmission of PUSCH transmission related DL control channels (i.e. a UL grant PDCCH and a PHICH corresponding to a PUSCH related to the UL grant PDCCH) on the same CC as in LTE-A for parallel processing per CC.

Accordingly, the present invention provides a method of transmitting/receiving a PHICH for PUSCH transmission (i.e. Msg3), which is scheduled through the RAR PDSCH in the SCC random access procedure, through a CC (RA-SCC scheduling CC) configured to schedule the CC (i.e. RA-SCC) on which the corresponding PUSCH is transmitted, (instead of a CC on which the RAR PDSCH (and/or PDCCH scheduling the same) is transmitted). Here, the RA-SCC scheduling CC refers to a CC configured to transmit a DL/UL grant PDCCH for the RA-SCC. In other words, the RA-SCC scheduling CC may refer to a CC that needs to monitor a PDCCH (C-RNTI) for the RA-SCC. The RA-SCC scheduling CC corresponds to the RA-SCC in non-cross-carrier scheduling and corresponds to the RA-MCC in cross-carrier scheduling. Here, the RA-MCC may differ from the PCC. That is, when cross-CC scheduling is applied (to the CC on which Msg3 is transmitted), the CC on which the PHICH for Msg3 is transmitted may be a CC configured to schedule a CC on which Msg3 has been transmitted (by a higher layer (e.g. radio resource control (RRC)). When non-cross-CC scheduling is applied, the CC on which the PHICH for Msg3 is transmitted may be the CC on which Msg3 has been transmitted. The suggestion of the present invention may be understood as a scheme in which acknowledgement information for UL transmission is received through a CC configured to monitor a PDCCH (C-RNTI) (irrespective of the CC through which the PDCCH (RA-RNTI) is received) when the UL transmission corresponds to the PDCCH (RA-RANTI). Meanwhile, Msg2 that schedules Msg3 may be transmitted/received through an arbitrary CC (referred to as CC1) and Msg2-PDCCH that schedules Msg2 may be transmitted/received through a CC1 scheduling SS. Here, CC1 may be a PCC and the CC1 scheduling SS may be a CSS (on the PCC).

The SCC random access procedure according to the present invention may be performed as follows with respect to the PHICH. The fundamental procedure is identical/similar to that shown in FIG. 12. For convenience, a CC on which Msg1 is transmitted is referred to as an RA-SCC, a CC configured to schedule the RA-SCC during cross-CC scheduling is referred to as an RA-MCC and a PHICH for Msg3 transmission is referred to as a Msg3-PHICH.

1) Msg0: this may be transmitted through an RA-SCC scheduling USS (eNB=>UE). Specifically, Msg0 (e.g. PDCCH order) may be transmitted through the USS of the RA-SCC in case of non-cross-CC scheduling and transmitted through the USS of the RA-MCC in case of cross-CC scheduling.

2) Msg1: this may be transmitted through the RA-SCC (UE=>eNB).

2-1) Msg2-PDCCH: this may be transmitted through the CC1 scheduling SS (eNB=>UE). Specifically, Msg2-PDCCH may be transmitted through the SS of CC1 in case of non-cross-CC scheduling and transmitted through the SS of the CC1 scheduling CC in case of cross-CC scheduling. Here, CC1 may be a PCC and the SS may be a CSS (on the PCC).

2-2) Msg2: this may be transmitted through CC1 (eNB=>UE). CC1 may be a PCC.

3) Msg3: this may be transmitted through the RA-SCC (UE=>eNB).

4) Msg3-PHICH: this may be transmitted through a CC configured to schedule the RA-SCC (eNB=>UE). Specifically, Msg3-PHICH may be transmitted through the RA-SCC in case of non-cross-CC scheduling and transmitted through the RA-MCC in case of cross-CC scheduling.

According to the suggestion of the present invention, even if Msg3 is scheduled through Msg2, the PHICH for Msg3 is transmitted through a CC configured to schedule the CC on which Msg3 is transmitted (i.e. configured to transmit a DL/UL grant PDCCH that schedules the CC). Accordingly, the CC on which Msg2 scheduling Msg3 is transmitted may be different from the CC on which the PHICH for Msg3 is transmitted. For example, if CC1 corresponds to the PCC in non-scheduling-CC scheduling, then Msg2 scheduling Msg3 may be transmitted through the PCC, whereas the PHICH for Msg3 may be transmitted through the RA-SCC instead of the PCC.

Alternatively, a method of transmitting the PHICH for Msg3 through CC1 (e.g. PCC) (on which Msg2 is transmitted) may be considered. Such method may be more suitable for a case in which DL synchronization for the RA-SCC is not stabilized when the RA-SCC is allocated through RRC signaling and then an initial random access procedure for the RA-SCC is performed (or when a random access procedure for the RA-SCC is performed immediately after activation following long-term inactivation).

The aforementioned method may be equally applied to Msg3-PHICH transmission in the contention-based SCC random access procedure triggered by the UE through RACH preamble transmission to an SCC without an additional instruction (according to PDCCH order) from the eNB.

The Msg3 transmission CC (i.e. RA-SCC) and the Msg3-PHICH transmission CC (i.e. RA-MCC) may differ from each other and UL bandwidths (e.g. the numbers of RBs) of the two CCs may differ from each other in the SCC random access procedure according to the present invention (particularly, when cross-CC scheduling is set for the RA-SCC), differently from the conventional random access procedure in which both Msg3 transmission and Msg3-PHICH transmission are performed through the PCC. Even in normal cross-CC scheduling, a PUSCH and a PHICH therefor may be transmitted through different CCs (i.e. an SCC and an MCC configured to schedule the SCC) and UL bandwidths (e.g. the numbers of RBs) of the two CCs may differ from each other. When PUSCHs starting with the same RB index are simultaneously transmitted through a plurality of CCs, PHICH resources for the PUSCHs may collide since PHICH resource indices are given based on the first RB index used for PUSCH transmission. Accordingly, a demodulation reference signal cyclic shift (DMRS CS) may be appropriately allocated in a UL grant PDCCH and an offset may be applied to PHICH resources on the basis of the DMRS CS to solve PHICH resource collision. In the case of random access procedure, however, the DMRS CS (or PHICH offset related information) is not included in UL grant information in the RAR PDSCH (Msg2) that schedules Msg3. Accordingly, UL scheduling may be restricted and delayed to avoid PHICH resource collision between a normal PDSCH and Msg3.

To solve this problem, the present invention provides a method of signaling information (e.g. DMRS CS or PHICH offset related information corresponding thereto) for determining/changing PHICH (Msg3-PHICH) resources for PUSCH (Msg3) transmission through the RAR PDSCH (Msg2) or PDCCH (Msg2-PDCCH) scheduling the same in the case of a random access procedure. Specifically, the following methods may be considered.

(1) Method of signaling the DMRS CS (or PHICH offset) through Msg2-PDSCH (RAR).

The DMRS CS (or PHICH offset) for determining Msg3 transmission and Msg3-PHICH resources may be signaled i) using some of fields constituting a UL grant in Msg2-PDSCH (RAR) while maintaining the UL grant size in Msg2-PDSCH (RAR) or ii) using a field that explicitly indicates the DMRS CS or PHICH offset information, which is newly added to the UL grant in Msg2-PDSCH (RAR).

(2) Method of signaling the DMRS CS (or PHICH offset) through Msg2-PDCCH

DMRS CS (or PHICH offset) information for Msg3 transmission and Msg3-PHICH determination may be signaled using a specific field (e.g. reserved field) in Msg2-PDCCH. The DMRS CS (or PHICH offset) information may be preferably signaled using a 3-bit HARQ number field in DCI format 1A transmitted on Msg2-PDCCH. Since HARQ is not applied to Msg2-PDSCH, the 3-bit HARQ number field in Msg2-PDCCH (DCI format 1A) may be used.

The aforementioned methods may be equally/similarly applied to not only contention and non-contention based SCC random access procedures on the basis of RACH preamble transmission through the SCC but also contention and non-contention based PCC random access procedures on the basis of RACH preamble transmission through the PCC.

Figure 13:
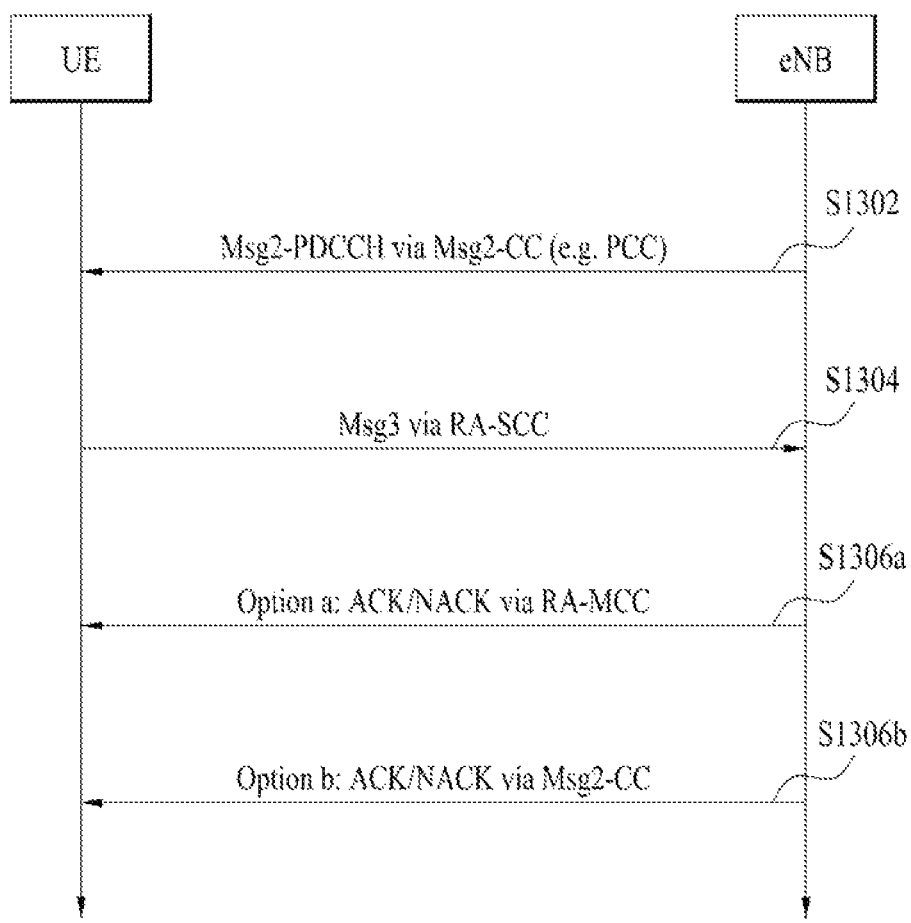
FIG. 13 illustrates an example of transmission of a physical hybrid ARQ indicator channel (PHICH) in the SCC random access procedure according to the present invention.

FIG. 13 illustrates a method of transmitting the PHICH for Msg3 in the SCC random access procedure. The method is illustrated based on the steps related to the PHICH shown in FIG. 12 and the above description is applicable to each step unless particularly mentioned.

The SCC random access procedure will now be described with respect to the PHICH with reference to FIG. 13. The CC on which Msg2-PDSCH is transmitted is referred to as Msg2-CC (CC1 in the above description), the CC on which Msg3 is transmitted is referred to as RA-SCC, the CC configured to schedule the RA-SCC is referred to as RA-MCC when cross-CC scheduling is configured, and a HARQ-ACK response to Msg3 transmission is referred to as ACK/NACK (or Msg3-PHICH) for convenience. The HARQ-ACK response may include ACK, NACK, DTX or NACK/DTX.

2-1) Msg2-PDCH: this may be transmitted through Msg2-CC scheduling SS (eNB=>UE) (not shown). Msg2-PDCCH includes DL grant information necessary to receive Msg2-PDSCH. Msg2-PDCCH may be transmitted through the SS of Msg2-CC in case of non-cross-CC scheduling and transmitted through the SS of a CC configured to schedule Msg2-CC in case of cross-CC scheduling. Here, Msg2-CC may be a PCC and the SS may be a CSS (on the PCC).

2-2) Msg2-PDSCH: this may be transmitted through Msg2-CC (eNB=>UE). Msg2-CC may be a PCC. Msg2-PDSCH includes UL grant information.

* Msg2-PDCCH/PDSCH may not include CC identification information indicating the RA-SCC. However, the UE may identify the CC to which the UL grant included in Msg2-PDSCH is applied on the basis of a CC on which the RACH preamble is transmitted since one random access procedure is performed at a time. For example, the CC to which the UL grant included in Msg2-PDSCH is applied may be a CC (i.e. PCC or RA-SCC) on which the RACH preamble is transmitted.

3) Msg3-PUSCH: this may be transmitted through the RA-SCC (UE=>eNB) (S1304).

4-1: option a) Msg3-PHICH: this may be transmitted through the CC configured to schedule the RA-SCC (eNB=>UE) (S1306a). Specifically, Msg3-PHICH may be transmitted through the RA-SCC in case of non-cross-CC scheduling and transmitted through the RA-MCC in case of cross-CC scheduling. The RA-MCC may differ from Msg2-CC (e.g. PCC). Considering a case in which a UL grant PDCCH that indicates Msg3 retransmission is transmitted, the (retransmission) UL grant PDCCH is scrambled with a C-RNTI and transmitted through the CC initially configured to schedule the RA-SCC. Accordingly, simultaneous transmission of the (retransmission) UL grant PDCCH and Msg3-PHICH on the same CC may be preferable for parallel processing per CC.

4-2: option b) Msg3-PHICH: this may be transmitted through Msg2-CC (eNB=>UE) (S1306b). This option may be suitable for a case in which DL synchronization of the RA-SCC and/or RA-MCC is not stabilized. Such option may be temporarily applied only when the initial random access procedure for the RA-SCC is performed (or when a random access procedure for the RA-SCC is performed immediately after activation following long-term inactivation).

Figure 14:
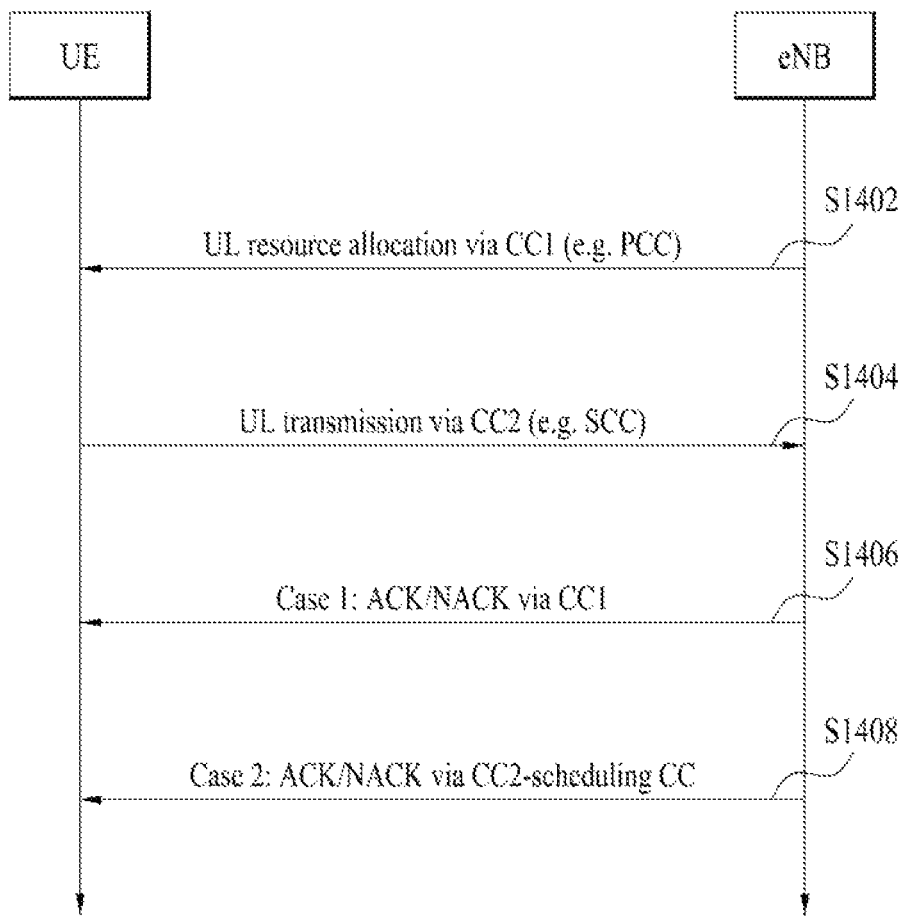
FIG. 14 illustrates normalized PHICH transmission according to the present invention.

FIG. 14 illustrates a PHICH transmission procedure according to an embodiment of the present invention. FIG. 14 shows a generalized example including a random access procedure and a non-random access procedure.

Referring to FIG. 14, the UE receives UL resource allocation information from the eNB through CC1 (S1402). CC1 includes a PCC. The UL resource allocation information is transmitted through a PDCCH having a C-RNTI in the non-random access procedure. The UL resource allocation information is transmitted through a random access response message (PDSCH) in the random access procedure and the PDSCH is indicated by a PDCCH having an RA-RNTI. Then, the UE may perform UL transmission on CC2 using the UL resource allocation information (S1404). CC2 may be an SCC. In case of the non-random access procedure, CC2 may be indicated using a CIF field value included in the UL allocation information (cross-CC scheduling) or may be identical to CC1 (non-cross-CC scheduling). In case of the random access procedure, CC2 corresponds to a CC on which the RA preamble is transmitted. Then, the UE may receive acknowledgement information for the UL transmission through a PHICH (S1406 and S1408). When the UL transmission is performed through the non-random access procedure, the acknowledgement information is received through CC1 (i.e. CC on which the UL allocation information is received) (case 1) (S1406).

When the UL transmission is performed through the random access procedure (i.e. Msg3 transmission), the acknowledgement information is received through the CC2-scheduling CC (i.e. RA-MCC) (case 1) (S1408). The RA-MCC may be CC2 or another CC (e.g. SCC) configured for scheduling CC2. CC1 may differ from the CC2-scheduling CC (i.e. RA-MCC).

Figure 15:
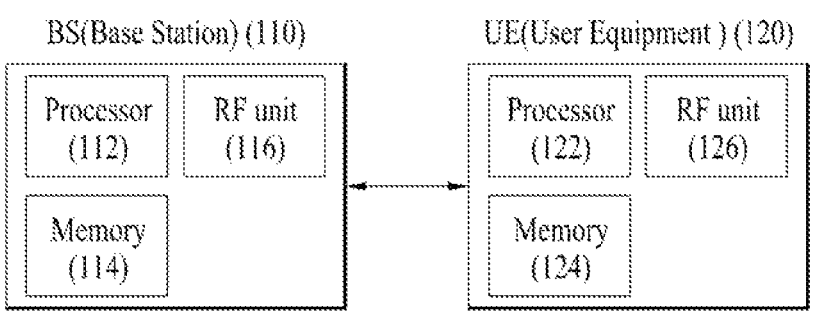
FIG. 15 illustrates a base station (BS) and UE applicable to embodiments of the present invention.

FIG. 15 illustrates a BS and a UE of a wireless communication system, which are applicable to embodiments of the present invention. When the wireless communication system includes a relay, the BS or UE can be replaced by the relay.

The BS 110 includes a processor 112, a memory 114 and a radio frequency (RF) unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present invention. The memory 124 is connected to the processor 122 and stores information related to operations of the processor 122. The RF unit 126 is connected to the processor 122 and transmits and/or receives an RF signal. The BS 110 and/or the UE 120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to a UE, BS or other apparatuses of a wireless communication apparatus.

The invention claimed is:

1. A method for receiving control information by a user equipment (UE) in a wireless communication system, the method comprising:
    receiving, via a primary cell (PCell) of a first timing advance group (TAG), a random access response (RAR) including uplink resource allocation information for a physical uplink shared channel (PUSCH);
    transmitting, via a first secondary cell (SCell) of a second TAG, a physical uplink shared channel (PUSCH) signal based on the uplink resource allocation information; and
    receiving, via a second SCell configured to schedule the first SCell, a physical hybrid ARQ channel (PHICH) signal including acknowledgement information for the PUSCH signal,
    wherein the first and second SCells are different from each other, and each of the first and second TAGs has a respective timing advance value applied to uplink transmission.

2. The method of claim 1, wherein the uplink resource allocation information for the PUSCH is received via a physical downlink shared channel (PDSCH) that includes the RAR to a RACH preamble previously transmitted by the UE via the first SCell.

3. The method of claim 2, wherein the PDSCH that includes the RAR is received only via the PCell.

4. The method of claim 1, further comprising:
    receiving a physical downlink control channel (PDCCH) via the second SCell, transmitting another PUSCH signal on the first SCell in accordance with the PDCCH received via the second SCell; and receiving another PHICH signal including acknowledgement information for the another PUSCH signal via the second SCell.

5. The method of claim 1, wherein the second SCell is a cell configured to monitor a physical downlink control channel (PDCCH) having a cell radio network temporary identifier (C-RNTI) for the first SCell.

6. A user equipment (UE) configured to receive control information in a wireless communication system, the UE comprising:

a radio frequency (RF) unit; and a processor operatively connected to the RF unit and configured to:

receive, via a primary cell(PCell) of a first timing advance group (TAG), a random access response (RAR) including uplink resource allocation information;

transmit, via a first secondary cell (SCell) of a second TAG, a physical uplink shared channel (PUSCH) signal based on the uplink resource allocation information; and receive via a second SCell configured to schedule the first SCell, a physical hybrid ARQ channel (PHICH) signal including acknowledgement information for the PUSCH, wherein the first and second SCells are different from each other, and each of the first and second TAGs has a respective timing advance value applied to uplink transmission.

7. The UE of claim 6, wherein the uplink resource allocation information for the PUSCH is received via a physical downlink shared channel (PDSCH) that includes the RAR to a RACH preamble previously transmitted by the UE via the first SCell.

8. The UE of claim 7, wherein the PDSCH that includes the RAR is received only via the PCell.

9. The UE of claim 6, wherein the processor is configured to:

receive a physical downlink control channel (PDCCH) via the second SCell, transmit another PUSCH signal on the first SCell in accordance with the PDCCH received via the second SCell; and receive another PHICH signal including acknowledgement information for the another PUSCH signal via the second SCell.

10. The UE of claim 6, wherein the second SCell is a cell configured to monitor a physical downlink control channel (PDCCH) having a cell radio network temporary identifier (C-RNTI) for the first SCell.

* * * * *

UNITED STATES PATENT AND TRADEMARK OFFICE
CERTIFICATE OF CORRECTION

PATENT NO. : 10,123,353 B2
APPLICATION NO. : 14/367436
DATED : November 6, 2018
INVENTOR(S) : Suckchel Yang et al.

It is certified that error appears in the above-identified patent and that said Letters Patent is hereby corrected as shown below:

In the Claims

In Column 18, Line 45:
Delete "for a physical uplink shared channel (PUSCH)"

Signed and Sealed this
Fourth Day of June, 2019

Andrei Iancu
*Director of the United States Patent and Trademark Office*